United States Patent Office 3,352,908
Patented Nov. 14, 1967

3,352,908
PRODUCTION OF DIISOPROPYL CARBODIIMIDE
George T. White and Keith B. Mullin, Asheville, N.C., assignors to Celanese Corporation of America, New York, N.Y., a corporation of Delaware
No Drawing. Filed Apr. 29, 1964, Ser. No. 363,630
1 Claim. (Cl. 260—551)

This invention is related to an improved method for the production of diisopropyl carbodiimide.

Dialkyl carbodiimides are very well known compounds. They have been prepared by various techniques in the past, such as the reaction of a dialkyl substituted thiourea with a metal oxide such as mercuric oxide or lead oxide. They have also been prepared by the rearrangement and condensation of organic isocyanates. With regard to these prior processes, the following patents may be mentioned as indicative of such past work: 3,108,138; 2,853,518; 2,853,473; and 2,938,892. In each case where carbodiimides have been prepared in the past, it has been indicated that water should be avoided in the process as much as possible and, for that matter, that the process should be operated under anhydrous conditions, because water reacts with the carbodiimide to produce the corresponding urea.

It has now been found, quite surprisingly, that one particular carbodiimide, i.e. diisopropyl carbodiimide, is in some way different from other carbodiimides in that it can be prepared under non-anhydrous conditions. It is, therefore, an object of this invention to provide a process for the production of diisopropyl carbodiimide which avoids the detrimental aspects of prior processes and at the same time produces extremely high yields of this most desirable compound.

The instant invention comprises the reaction of diisopropyl thiourea and a metal oxide in water at the refluxing temperature of the system. By carrying out this process at this temperature and under these conditions, it has been quite surprisingly found that the product diisopropyl carbodiimide can be removed from the reaction mass by distillation with the desired product and the water coming over as distillate and that this distillate separates into two substantially immiscible layers, a water layer and a product layer. The desired product can be conveniently removed by decantation in yields as high as 95 percent of theoretical. In fact, the usual yields by the process of this invention generally are in excess of 90 percent as opposed to approximately 80 percent by prior art processes. In carrying out this reaction, the temperature is maintained at about 96° C. to 98° C., the reflux temperature of the system.

The following example is given by way of illustration of the invention and is in no way considered to be as limiting of the scope of this invention.

Example

Eighty (80) grams of diisopropyl thiourea, 120 grams of lead oxide and 250 grams of water were mixed in a reaction vessel and distilled. When the reaction was completed (after about 80 minutes) as evidenced by a single phase distillate, the top layer was separated and contained 60 grams of carbodiimide which is 95 percent of theoretical.

It is, of course, understood that this process can be carried out either batch-wise or continuous, as desired. In a continuous process, the reactants would be continually added to a reaction vessel equipped with a continuous distillation means whereby the product was removed at a rate comparable to the feed of reactants. It is further practical to carry out the reaction in the presence of water alone or in combination with other solvents and still further in the presence of a non-aqueous solvent. The product of this reaction can then be separated from the reaction mass by water azeotropic distillation or steam distillation, as desired.

It is to be understood that the foregoing detailed description is given merely by way of illustration and that many variations may be made therein without departing from the spirit of our invention.

The embodiments of the invention in which an exclusive property or privilege is claimed are defined as follows:

The improved process of producing diisopropyl carbodiimide which consists of introducing into a reaction zone diisopropyl thiourea, lead oxide and water, heating said reaction mass to the refluxing temperature of the system to produce diisopropyl carbodiimide, recovering said diisopropyl carbodiimide from said reaction mass by distillation in the presence of water obtaining a mixture of water and said diisopropyl carbodiimide as a distillate from said distillation, and separating said water and said diisopropyl carbodiimide by decantation.

References Cited
UNITED STATES PATENTS
3,201,463  8/1966  Ruby _____ 260—551

OTHER REFERENCES
Weissberger: Technique of Organic Chemistry, vol. IV, Distillation (1951), pp. 15–18, 29.

WALTER A. MODANCE, *Primary Examiner.*
H. I. MOATZ, *Assistant Examiner.*